Patented Aug. 2, 1932

1,869,557

UNITED STATES PATENT OFFICE

KINGSLEY A. GILLESPIE, OF STAMFORD, CONNECTICUT, ASSIGNOR TO THE STAMFORD RUBBER SUPPLY COMPANY, OF STAMFORD, CONNECTICUT, A CORPORATION OF CONNECTICUT

RUBBER SUBSTITUTE

No Drawing. Application filed March 7, 1929. Serial No. 345,243.

This invention relates to the production of a rubber substitute generally termed "rubber factice".

Two types of factice have been commercially produced and these are classified according to their method of manufacture. Brown factice is generally produced by mixing an oil with sulphur and subjecting the mixture to heat for the purpose of vulcanization. White factice is produced without the application of heat and a different composition is used. The present invention relates to the production of white factice.

White factice is prepared by treating an oil such as vegetable, fish or animal oils with sulphur chloride as a vulcanizing agent, generally in the presence of a stabilizer. This stabilizer usually consists of an oxide, hydroxide or carbonate of an alkaline earth metal and is used to neutralize the acid formed during the manufacturing operation and to stabilize the product produced. These ingredients and fillers or other compounding materials may be mixed in any suitable manner and molded to any desired form.

White factice is rarely used alone but is generally added to natural rubber. Previous to such use it is usually rendered granular by grinding. The granular factice is added to the rubber on the mill or in the mixer when the rubber has reached the proper stage of mastication.

In rubber manufacture it is customary to incorporate in the rubber mixture an accelerator of vulcanization and the more powerful of these are referred to as ultra or low temperature curing accelerators. Such accelerators are now in general commercial use and further description thereof is deemed unnecessary.

It has been found in practice that when rubber factice as heretofore produced is incorporated as an ingredient in a rubber compound, this factice acts to paralyze the accelerator or at least to materially reduce its efficiency. This is believed to be due to the acid formed in the factice at the temperature of the mass during the vulcanization of the rubber compound. Experience has shown that even an excess of stabilizer in the mass failed to overcome this trouble.

One of the objects of the present invention is to produce in a simple and economical manner a white factice which may be added to a rubber compound without materially lessening the effectiveness of the accelerator used. This may be accomplished by incorporating in the factice a substance which is relatively stable at low or ordinary temperatures but when subjected to sufficient heat will generate ammonia. Various ammonium salts of the volatile type such as ammonium carbonates and carbamates have proven entirely satisfactory for this purpose. This substance may be added to the other ingredients of the white factice during the mixing operation. The temperature at which decomposition of the substance will take place, or in other words, at which ammonia will be generated to any material extent varies but in the case of the salts mentioned this is in the vicinity of 30° to 60° C.

This factice is incorporated in the rubber stock in the usual manner either on the mill or in the mixer and the rubber thus produced is used in the manufacture of any of the articles for which this compound is suitable. These articles are then subjected to heat for the purpose of vulcanization. The heating of the rubber for this purpose causes the ammonia to be generated throughout the mass and this gas effectually prevents paralyzing of the accelerator or material reduction of its efficiency.

In the manufacture of white factice as heretofore practiced, the principal ingredients and proportions thereof have been approximately as follows:—100 parts oil, 2 to 5 parts stabilizer, 15 to 35 parts sulphur monochloride. To this may be added mineral oil or any of the usual fillers or compounding materials as already mentioned.

The oil ingredient used is generally one of the vegetable oils such as rape or corn oil although fish or animal oils are suitable for this purpose. In order to distinguish these oils they will hereinafter be referred to as "non-mineral oils" and it should be understood that this term is intended to include vegetable, fish or animal oils.

In my improved white factice I add to the ingredients above mentioned from 2½ to 20 parts of an ammonium salt or other substance such as dicyandiamid which will generate ammonia when subjected to heat.

A satisfactory formula is: 100 parts rape seed oil, 5 parts magnesium oxide (MgO), 10 parts ammonium bicarbonate ($NH_4HCO_3$), 20 parts sulphur monochloride ($S_2Cl_2$).

The ammonium bicarbonate when subjected to sufficient heat breaks down to form $NH_3$, $CO_2$ and $H_2O$. The ammonia gas thus liberated quickly permeates the mass and neutralizes any acid which may be formed therein before such acid may affect the accelerator. It is inadvisable to use a proportion of the ammonium salt materially in excess of that suggested above as the volume of combined gases generated tends to render the rubber spongy.

In the preparation of the white factice some heat is evolved in the mass by the action of the sulphur monochloride and steps should be taken to maintain the temperature of this mass below that at which the ammonium salt will decompose to any material extent. This may be easily accomplished by circulating a cooling fluid about the mass during the manufacturing operations, although any other suitable method may be adopted. If the temperature of the mass rises materially above this point at least some of the ammonia gas will be liberated and therefore will not be available when the factice is incorporated with the rubber.

While the stabilizer or neutralizer as previously described is generally advantageous it is not a necessary ingredient of my improved factice composition.

It will thus be seen that there has been provided an invention of an essentially practical nature, in which the objects are fully attained.

I claim:

1. A composition of matter comprising 100 parts non-mineral oil, 15 to 35 parts low temperature vulcanizing agent, 2 to 5 parts stabilizer and 2½ to 20 parts ammonium salt.

2. A rubber factice comprising 100 parts non-mineral oil, 15 to 35 parts sulphur monochloride, 2 to 5 parts oxide of an alkaline earth metal and 2½ to 20 parts volatile ammonium salt.

3. The method of manufacturing a rubber factice which consists in mixing a non-mineral oil, a low temperature vulcanizing agent and a substance which when subjected to heat generates ammonia and maintaining the mass during vulcanization at a temperature below that at which the ammonia is generated.

4. The method of manufacturing a white rubber factice which consists in mixing a non-mineral oil, sulphur monochloride and a substance which when subjected to heat generates ammonia, and subjecting the mass to cooling action during the manufacturing operation to maintain the same at a temperature below that at which ammonia is materially generated.

5. The method of manufacturing a white rubber factice which consists in mixing a non-mineral oil, sulphur monochloride and a volatile ammonium salt, and during vulcanization maintaining the mass at a temperature below that at which the salt will materially decompose.

6. The method of manufacturing a white rubber factice which consists in mixing a non-mineral oil, sulphur monochloride, a stabilizer and a volatile ammonium salt and maintaining the mass at a temperature below that at which the salt will materially decompose until vulcanization is complete.

In testimony whereof I have signed my name to this specification this 28th day of February, 1929.

KINGSLEY A. GILLESPIE.